United States Patent
Hosoe et al.

(10) Patent No.: US 8,845,960 B2
(45) Date of Patent: *Sep. 30, 2014

(54) HYDROGEN STORAGE MATERIAL AND METHOD FOR PRODUCING THE SAME

(75) Inventors: Mitsuya Hosoe, Wako (JP); Terumi Furuta, Wako (JP); Hiroshi Sakai, Wako (JP); Izuru Kanoya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 732 days.

This patent is subject to a terminal disclaimer.

(21) Appl. No.: 12/537,648

(22) Filed: Aug. 7, 2009

(65) Prior Publication Data

US 2010/0035104 A1    Feb. 11, 2010

(30) Foreign Application Priority Data

Aug. 8, 2008    (JP) ................................ 2008/2060998

(51) Int. Cl.
*C22C 21/00*    (2006.01)

(52) U.S. Cl.
USPC .................. 420/528; 423/658.2; 252/188.27; 420/900

(58) Field of Classification Search
USPC ...................... 420/900; 502/414; 75/255, 252; 423/658.2; 252/188.27
See application file for complete search history.

(56) References Cited

U.S. PATENT DOCUMENTS

| 7,837,976 B2 * | 11/2010 | Sandrock et al. .......... 423/658.2 |
| 7,842,275 B2 * | 11/2010 | Hosoe et al. ................. 423/645 |
| 2005/0164878 A1 | 7/2005 | Morioka et al. |
| 2008/0146442 A1 * | 6/2008 | Hosoe et al. ................. 502/414 |

FOREIGN PATENT DOCUMENTS

JP    2004-18980    1/2004

* cited by examiner

*Primary Examiner* — Roy King
*Assistant Examiner* — Janelle Morillo
(74) *Attorney, Agent, or Firm* — Nelson Mullins Riley & Scarborough LLP; Anthony A. Laurentano

(57) ABSTRACT

A crystalline $AlH_3$ is ball-milled in a hydrogen atmosphere while applying a force of 10 G to 30 G (in which G is gravitational acceleration). The milling time is more than 10 minutes and less than 60 minutes. The hydrogen storage material thus produced has a structure containing a plurality of matrix phases and a grain boundary phase disposed between the matrix phases. The matrix phases comprise Al and have a side length of 1 to 200 nm, and the grain boundary phase comprises an amorphous phase and contains hydrogen in the state of a solid solution.

9 Claims, 10 Drawing Sheets

HYDROGEN STORAGE MATERIAL AND METHOD FOR PRODUCING THE SAME

BACKGROUND OF THE INVENTION

1. Field of the Invention

The present invention relates to a hydrogen storage material capable of reversibly storing and releasing hydrogen, and a method for producing the same.

2. Description of the Related Art

As is known in the art, fuel cells generate electricity using a fuel gas such as hydrogen supplied to an anode and an oxidant gas such as oxygen supplied to a cathode. Therefore, for example, a fuel-cell car utilizing the fuel cell has a vessel for storing the hydrogen gas. The oxidant gas of the air and the hydrogen gas supplied from the gas storage vessel are used as reactant gases to drive the fuel-cell car.

As is clear from the above, as the gas storage vessel has a higher hydrogen storage capacity, the fuel-cell car can be driven over a longer distance. However, when the fuel-cell car has an excessively large vessel, the weight of the fuel-cell car is increased, resulting in a higher load on the fuel cell disadvantageously.

From this viewpoint, various studies have been made on a gas storage vessel having a high hydrogen storage capacity with a small volume. For example, in Japanese Laid-Open Patent Publication No. 2004-018980, $AlH_3$, one of hydrogen storage materials capable of reversibly storing and releasing hydrogen, is used to increase the hydrogen storage capacity.

A crystalline $AlH_3$ 1 shown in FIG. 10 has a microstructure containing matrix phases 2 approximated by squares and a grain boundary phase 3 disposed between the matrix phases 2, 2. In this case, the matrix phases 2 have a side length t1 of approximately 100 μm, and the grain boundary phase 3 has a width w1 of several micrometers and occupies only a small volume percentage in the structure. When the crystalline $AlH_3$ is subjected to an X-ray diffraction measurement, sharp peaks of at least one of α, β, and γ phases can be found in the diffraction pattern.

It should be noted that the matrix phases are composed of $AlH_3$ having a crystal lattice containing Al and H, while the grain boundary phase is composed of a solid solution of H in an amorphous Al.

As a result of intense research, the inventor has found that, in the process of storing hydrogen in the crystalline $AlH_3$, the grain boundary phase 3 firstly contributes to the hydrogen storage. The grain boundary phase 3 can store hydrogen even at relatively low pressure. However, since the ratio of the grain boundary phase 3 to the structure is only several % by volume as described above, the hydrogen storage in the grain boundary phase 3 rapidly reaches the limit. It should be understood that the grain boundary phase 3 has a remarkably low hydrogen storage capacity.

Then, the matrix phases 2, which occupy the large part in the structure, begin to store hydrogen. However, significantly high activation energy is needed for the hydrogen storage in the matrix phases 2. The matrix phases 2 cannot store hydrogen at low hydrogen pressure if the temperature is constant. When the hydrogen pressure reaches several thousand atm (several hundred MPa), the matrix phases 2 can actively store hydrogen.

However, the fill pressure of the gas storage vessel is generally around 20 MPa, maximally around 75 MPa. Therefore, when the crystalline $AlH_3$ is used in the gas storage vessel, it is difficult to store hydrogen in the matrix phases 2.

As described in Japanese Laid-Open Patent Publication No. 2004-018980, the $AlH_3$ begins to release hydrogen at about 130° C., and the stored hydrogen is completely released before the temperature reaches 200° C. Therefore, in the case of using the gas storage vessel containing the crystalline $AlH_3$ in the fuel-cell car, in order to supply a large amount of hydrogen from the vessel to the fuel cell, it is necessary to apply heat until the vessel has a temperature of 130° C. or higher. Thus, the amount of heat supplied to other components in the fuel-cell car is reduced, whereby it is difficult to increase the heat efficiency of the entire system of the fuel-cell car.

SUMMARY OF THE INVENTION

A general object of the present invention is to provide a hydrogen storage material that can advance a hydrogen storage reaction at low pressure.

A principal object of the present invention is to provide a hydrogen storage material that can advance a hydrogen releasing reaction at low temperature.

Another object of the present invention is to provide a method capable of producing the hydrogen storage material having the above property.

According to an aspect of the present invention, there is provided a hydrogen storage material capable of reversibly storing and releasing hydrogen, having a structure comprising a plurality of matrix phases and a grain boundary phase disposed between the matrix phases, wherein the matrix phases comprise Al and have a side length of 1 to 200 nm, and the grain boundary phase comprises an amorphous phase and contains hydrogen in the state of a solid solution.

As described above, the microstructure of the crystalline $AlH_3$ contains the approximately square matrix phases and the grain boundary phase disposed therebetween, the matrix phases have an approximately micrometer-order side length, and the grain boundary phase is composed of the solid solution of hydrogen. When the crystalline $AlH_3$ is subjected to an X-ray diffraction measurement, sharp peaks can be found in the diffraction pattern. However, the crystalline $AlH_3$ having such a structure can hardly store hydrogen under a pressure lower than a predetermined pressure.

In contrast, the hydrogen storage material according to the present invention can store a large amount of hydrogen even at low pressure. This is presumed because the content of the grain boundary phase, which hydrogen can be readily stored in and released from compared with the matrix phases, is higher in the hydrogen storage material of the present invention than in the conventional crystalline $AlH_3$. Thus, the hydrogen storage material of the present invention contains a large amount of the grain boundary phase, which hydrogen can be readily stored in and released from, and thereby can store a large amount of hydrogen even at low pressure.

As is clear from the above, in the present invention, only a relatively low energy is required for releasing hydrogen stored in the grain boundary phase. In other words, hydrogen can be readily released from the grain boundary phase at relatively low temperature. In the hydrogen storage material of the present invention, the hydrogen release is started at a temperature of 100° C. or lower practically.

As described above, in the present invention, since the microstructure contains the matrix phases and the grain boundary phase, the matrix phases comprise Al and have a side length of 1 to 200 nm, and the grain boundary phase comprises an amorphous phase and contains hydrogen in the state of a solid solution, the hydrogen storage material can advance a hydrogen storage reaction at low pressure and can advance a hydrogen releasing reaction at low temperature. Therefore, for example in the case of using a gas storage vessel containing the hydrogen storage material in a fuel-cell car, an apparatus for increasing the internal pressure of the vessel is not needed, thereby resulting in a simple fuel-cell car structure. Furthermore, the amount of heat supplied to the gas storage vessel can be reduced, whereby the surplus amount of heat can be supplied to another component to increase the heat efficiency of the entire system of the fuel-cell car.

Additionally, in the present invention, the structure of the gas storage vessel can be simplified to reduce the equipment investment. Thus, it is unnecessary to form a heating apparatus and a particular structure for improving pressure resistance.

According to another aspect of the present invention, there is provided a method for producing a hydrogen storage material, comprising the step of ball-milling a crystalline $AlH_3$, wherein the ball milling is carried out in a hydrogen atmosphere for a period of more than 10 minutes and less than 60 minutes while applying a force of 10 G to 30 G (in which G is gravitational acceleration) to the crystalline $AlH_3$. The produced hydrogen storage material has a structure comprising a plurality of matrix phases and a grain boundary phase disposed between the matrix phases, the matrix phases comprise Al and have a side length of 1 to 200 nm, and the grain boundary phase comprises an amorphous phase and contains hydrogen in the state of a solid solution.

In the present invention, the large force of 10 G to 30 G is applied to the $AlH_3$ in the ball milling. By using the force, the crystalline $AlH_3$ is nanostructured, and H is separated from the $AlH_3$ of the matrix phases and solid-dissolved in the grain boundary phase.

Thus, in the present invention, the hydrogen storage material, which can store a large amount of hydrogen even at low pressure and can release a large amount of hydrogen even at low temperature, can be produced only by adding the step of ball-milling the $AlH_3$ while applying the force.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of the hydrogen storage material and the producing method of the present invention will be described in detail below with reference to accompanying drawings.

Figure 1:
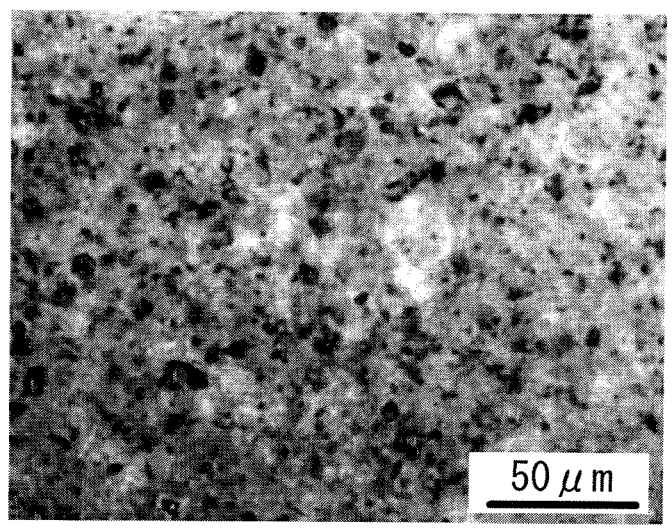
FIG. 1 is a TEM photograph of a hydrogen storage material according to an embodiment of the present invention.
Figure 2:
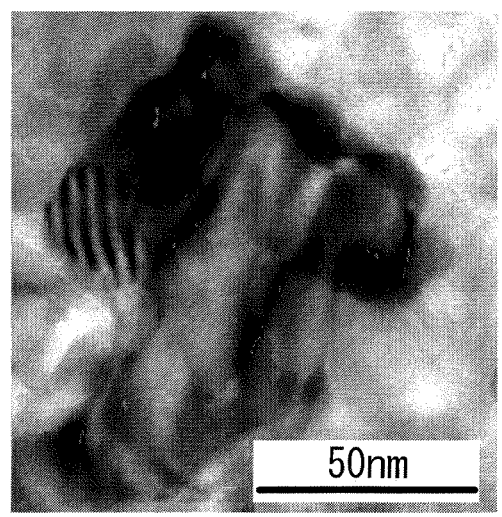
FIG. 2 is a magnified TEM photograph of a black portion shown in FIG. 1.
Figure 3:
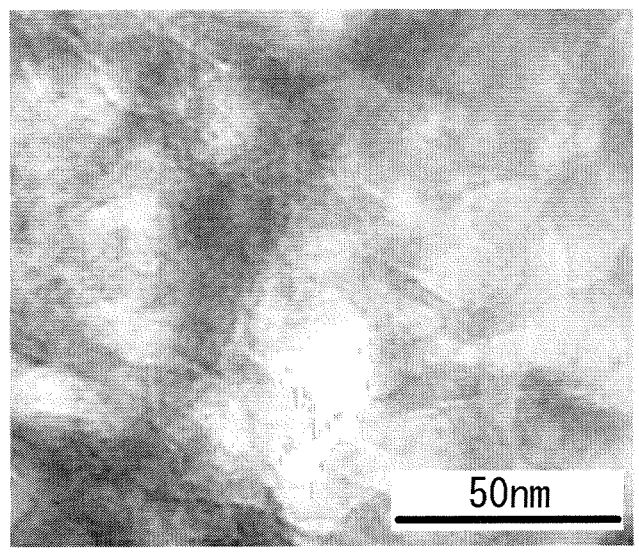
FIG. 3 is a magnified TEM photograph of a white portion shown in FIG. 1.

FIG. 1 is a transmission electron microscope (TEM) photograph of a hydrogen storage material according to this embodiment. As shown in FIG. 1, the hydrogen storage material has portions indicated by black color and portions indicated by white color. The black portion is an Al crystal lattice (a matrix phase), and an enlarged image thereof is shown in FIG. 2. On the other hand, the white portion is an amorphous phase (a grain boundary phase), and an enlarged image thereof is shown in FIG. 3. As described below, an $AlH_3$ grain boundary is swollen to form the grain boundary phase.

Figure 4:
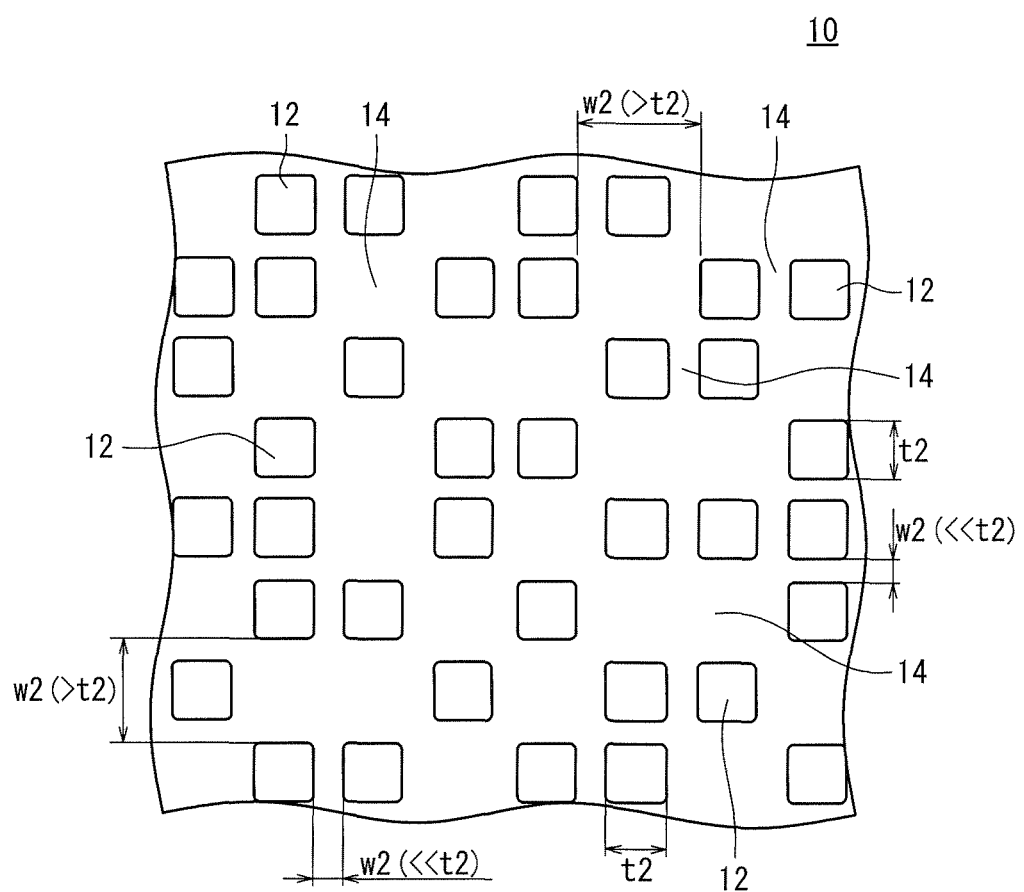
FIG. 4 is a schematic explanatory view showing a microstructure of the hydrogen storage material of the embodiment.

FIG. 4 is a schematic explanatory view showing a microstructure of the hydrogen storage material 10 shown in the above TEM photograph. The structure of FIG. 4 contains the matrix phases 12, and the grain boundary phase 14 is disposed therebetween.

In the hydrogen storage material 10, the matrix phases 12 can be approximated by quadrangles with rounded corners, and the quadrangles have a side length t2 of 1 to 200 nm. The width w2 of the grain boundary phase 14 may vary in the structure, and may be 1 to several nm, more than 10 nm, or more than the side length t2 of the matrix phases 12. As is clear from FIG. 4, the content of the grain boundary phase 14 is higher than that of the crystalline $AlH_3$, and is about 20% to 90% by volume.

In this embodiment, the matrix phases 12 are composed of Al dissociated from $AlH_3$, and the residual H is contained in the grain boundary phase 14 in the state of a solid solution. Thus, the grain boundary phase 14 is composed of $AlH_x$ ($0<x\leq3$).

Figure 10:
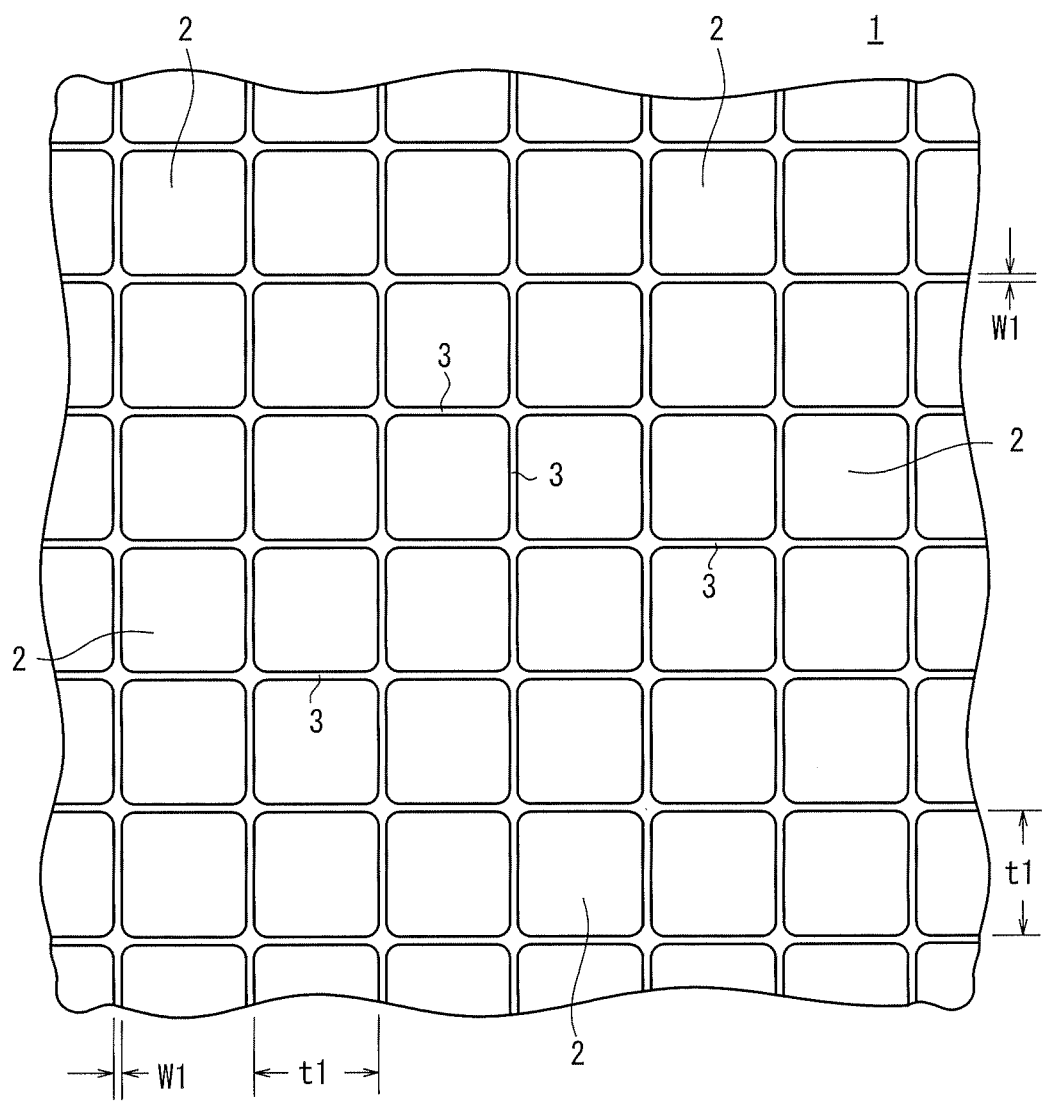
FIG. 10 is a schematic explanatory view showing a microstructure of the crystalline $AlH_3$.

As described above, in the case of storing hydrogen in storage sites of the crystalline $AlH_3$ of FIG. 10, the hydrogen storage is started in the grain boundary phase 3. Also in the hydrogen storage material 10 of this embodiment, the hydrogen storage is started not in the matrix phases 12 but in the grain boundary phase 14.

Figure 5:
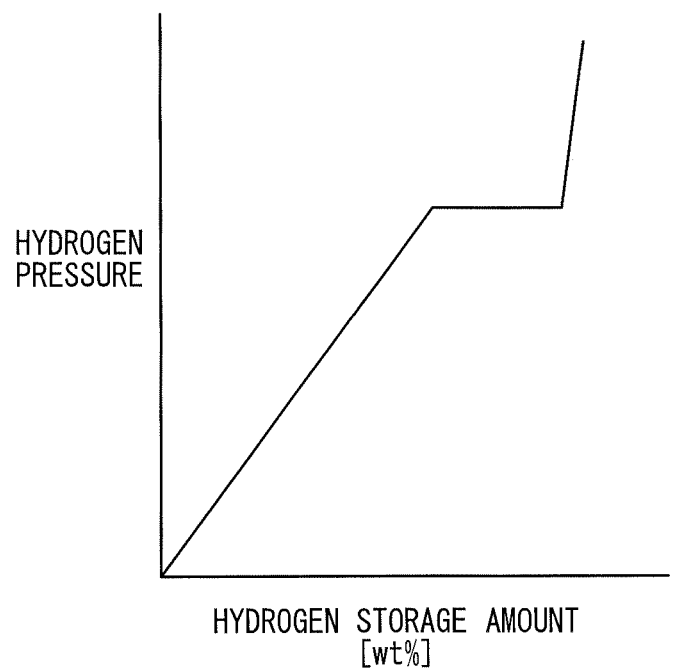
FIG. 5 is a schematic PCT diagram observed in the process of storing hydrogen in the hydrogen storage material of the embodiment.

As described above, the hydrogen storage material 10 of this embodiment has a remarkably higher content of the grain boundary phase 14 as compared with the crystalline $AlH_3$ of FIG. 10. As above, the grain boundary phase 14 can store hydrogen readily even at relatively low hydrogen pressure. Therefore, as shown in the PCT diagram of FIG. 5, the hydrogen storage material 10 having a high content of the grain boundary phase 14 exhibits a high hydrogen storage amount under a relatively low pressure of several tens MPa. In other words, the grain boundary phase 14 needs only a low activation energy for the hydrogen storage and thereby can store hydrogen relatively readily, so that the hydrogen storage material 10 having a higher content of the grain boundary phase 14 can store a larger amount of hydrogen under a relatively low hydrogen pressure of dozen to several tens MPa as compared with the crystalline $AlH_3$.

The grain boundary phase 14 of the hydrogen storage material 10 can release H at 60° C. to 70° C. as described below. Thus, the grain boundary phase 14 can release hydrogen at a temperature of 100° C. or lower. For example in the case of using a gas storage vessel containing the hydrogen storage material 10 in a fuel-cell car, the vessel may be heated to a temperature of slightly higher than 70° C. Therefore, a large amount of heat can be applied to another component of the fuel-cell car, whereby the heat efficiency of the entire fuel-cell car system can be improved.

There is no need to form a heating apparatus or to excessively increase the fill pressure of the gas storage vessel in view of accelerating the hydrogen storage. Thus, in this embodiment, the structure of the fuel-cell car system can be simplified to prevent the increase of equipment investment.

The hydrogen storage material 10 of this embodiment may be produced as follows.

$AlH_3$ is synthesized first.

For example, $AlH_3$ can be obtained by dissolving $AlCl_3$ in a diethyl ether solution of $LiAlH_4$ to carry out a reaction therebetween at ambient temperature. LiCl generated by the reaction is removed by filtration, and the filtrate is exposed to reduced pressure using a vacuum pump or the like at room temperature to evaporate diethyl ether. Then, the residue is dried under reduced pressure at 40° C. to 80° C. to obtain an $AlH_3$ solid. At this point, the $AlH_3$ solid is composed of a crystalline $AlH_3$.

The $AlH_3$ is ball-milled in a hydrogen gas atmosphere while applying a force of 10 G to 30 G (in which G is gravitational acceleration). Specifically, the $AlH_3$ is enclosed in a pot together with a crushing ball in the hydrogen atmosphere such that the internal hydrogen pressure of the pot is 0.1 to 2 MPa.

Then, the pot is placed on a disc-shaped base plate of a planetary ball milling apparatus, and fixed between a rotatable table and a press shaft. The disc-shaped base plate and the rotatable table are both rotated.

In the planetary ball milling apparatus, the pot is in orbital motion by rotation of the disc-shaped base plate and rotated on its axis by rotation of the rotatable table. Thus, the pot revolves orbitally around a rotary shaft connected to the disc-shaped base plate, and is rotated on its axis around the press shaft. The force is applied to the $AlH_3$ in the pot by the orbital motion and the axis motion. The inside of the pot is kept under the hydrogen atmosphere during the ball milling, thereby preventing the release of H dissolved in the grain boundary phase 14.

The force of 10 G to 30 G can be applied by controlling the rotation speed of the disc-shaped base plate or the rotatable table, the treatment time, etc. For example, when the pot has a diameter of 80 mm, a height of 100 mm, and an internal volume of 80 ml, and the disc-shaped base plate has a diameter of about 300 mm, the rotation speed of the disc-shaped base plate (the orbital motion) may be 350 to 1000 rpm, the rotation speed of the rotatable table (the axis motion) may be 800 to 2400 rpm, and both of the orbital motion and the axis motion may be carried out for a period of more than 10 minutes and less than 60 minutes. When the treatment time is 10 minutes or less, the above microstructure cannot be sufficiently formed. On the other hand, when the treatment time is 60 minutes or more, hydrogen is excessively released from the grain boundary phase 14, resulting in low hydrogen storage.

As described above, in this embodiment, a high energy is applied to the crystalline $AlH_3$. As a result, H is dissociated from $AlH_3$ in the matrix phases 2 of the crystalline $AlH_3$ (see FIG. 10) to form the matrix phases 12 (see FIG. 4), which comprise Al and have a side length of 1 to 200 nm. Meanwhile the grain boundary phase 3 (see FIG. 10) is swollen, and H dissociated from the matrix phases 2 ($AlH_3$) is solid-dissolved therein, to form the grain boundary phase 14 (see FIG. 4) comprising $AlH_x$ ($0<x\leq3$). Eventually, the crystalline $AlH_3$ is converted to the hydrogen storage material 10 having such a nanostructure. In an X-ray diffraction measurement of the hydrogen storage material 10, peaks of Al are found as described below.

Example 1

13 g of $AlCl_3$ was added to and dissolved in 300 ml of a diethyl ether solution containing 1 mol/l of $LiAlH_4$, and was reacted at the ambient temperature until gas generation stopped. Then, LiCl precipitated in the solution was removed by filtration, and the filtrate was exposed to reduced pressure for 1 hour using a vacuum pump to evaporate diethyl ether. The residue was dried under reduced pressure for 1 hour at each of 40° C., 60° C., and 80° C., to obtain 2 g of a particulate synthetic product. The steps were repeated to prepare 6 g of the particulate synthetic product in total.

3 g of the particulate synthetic product was enclosed together with a crushing ball in a pot having an outer diameter of 80 mm, a height of 100 mm, and an internal volume of 80 ml. In this step, the enclosure was carried out in a hydrogen atmosphere, and hydrogen was introduced to the pot such that the internal hydrogen pressure of the pot was 0.3 MPa.

The pot was sandwiched between a rotatable table and a press shaft on a disc-shaped base plate of a planetary ball milling apparatus (manufactured by Fritsch, Germany), and subjected to ball milling. The disc-shaped base plate had a diameter of 300 mm, and the rotation speed thereof was 700 rpm. The rotation speed of the rotatable table (i.e. the speed of rotation of the pot on its axis) was 1600 rpm, and the ball milling time was 55 minutes. A force of 16 G was applied to the particulate synthetic product under the conditions.

Figure 6:
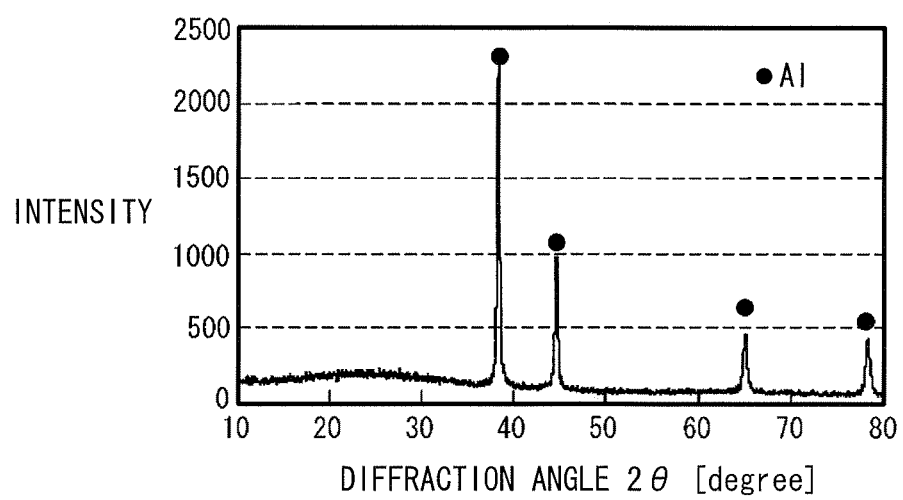
FIG. 6 is an X-ray diffraction pattern of a final product (the hydrogen storage material of the embodiment)
Figure 7:
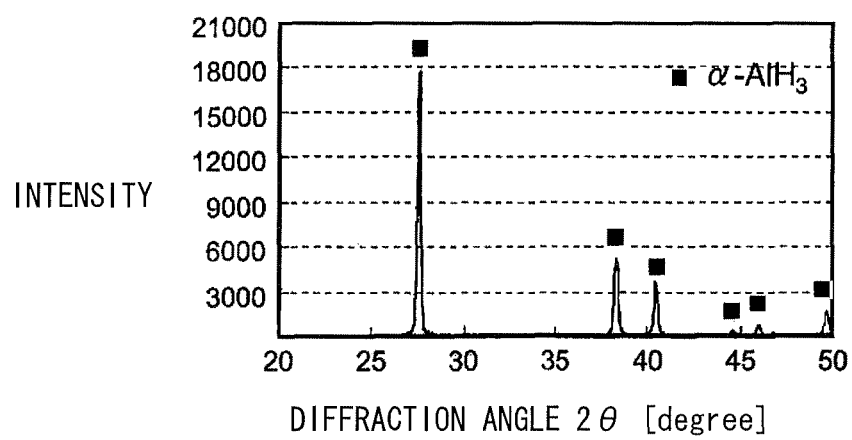
FIG. 7 is an X-ray diffraction pattern of a particulate synthetic product (a crystalline $AlH_3$)

The ball-milled final product thus obtained was subjected to X-ray diffraction measurement using an X-ray diffractometer manufactured by Bruker. As a result, as shown in FIG. 6, only peaks of Al were observed. Also the particulate synthetic product was subjected to X-ray diffraction measurement before the ball milling. As a result, as shown in FIG. 7, sharp peaks of $\alpha$-$AlH_3$ were observed.

It is clear from the results that the particulate synthetic product is composed of $AlH_3$, and the final product has a matrix phase composed of Al. The maximum intensity of the peaks in FIG. 6 was about ⅙ of the maximum intensity of the peaks in FIG. 7. It is clear from the results that the matrix phase volume ratio of the microstructure is lower in the final product than in the particulate synthetic product. In contrast, the grain boundary phase volume ratio of the microstructure is higher in the final product than in the particulate synthetic product.

In addition, the matrix phase in the final product had a side length of 40 nm, calculated from the measurement result of FIG. 6 using the following equation (1) (Scherrer equation).

$$D=K\lambda/(\beta \cos \theta) \tag{1}$$

In the equation (1), D is a side length (Angstrom), K is the Scherrer constant, $\lambda$ is an X-ray tube wavelength, $\beta$ is a half peak width, and $\theta$ is a diffraction angle.

It is clear from the results that a hydrogen storage material nanostructure can be obtained by the ball milling.

Example 2

Figure 8:
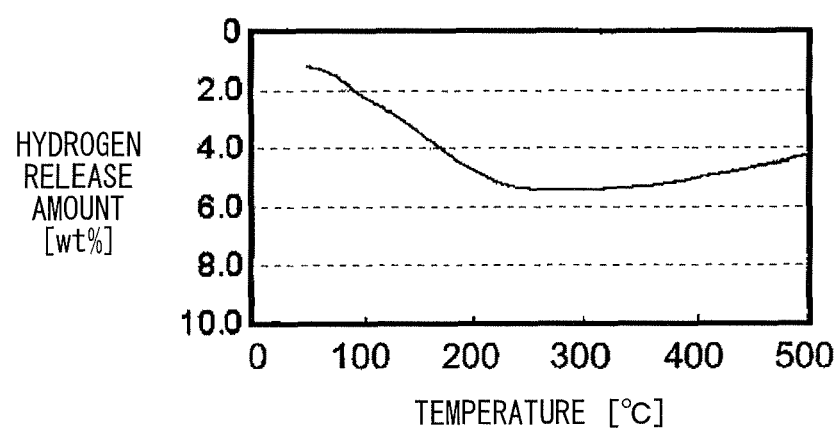
FIG. 8 is a thermogravimetric analysis chart of the final product (the hydrogen storage material of the embodiment)

10 mg of the ball-milled final product was collected and subjected to a thermogravimetric analysis in an $N_2$ gas flow. The measurement was carried out in a temperature range of the room temperature to 400° C. at a heating rate of 5° C./minute. The results are shown in FIG. 8. The weight reduction shown in FIG. 8 corresponds to hydrogen release.

As shown in FIG. 8, even though the matrix phase of the final product was composed of Al free from hydrogen, the hydrogen release from the final product was started at 100° C. or lower. Furthermore, the ratio of the weight reduction (i.e. the hydrogen release) was more than 5 wt % of the final product. Thus, the volume ratio of the grain boundary phase was remarkably increased, hydrogen was stored (solid-dissolved) in the grain boundary phase, and the stored hydrogen was readily released.

As described above, the final product can release a large amount of hydrogen even though the matrix phase was free from H.

Figure 9:
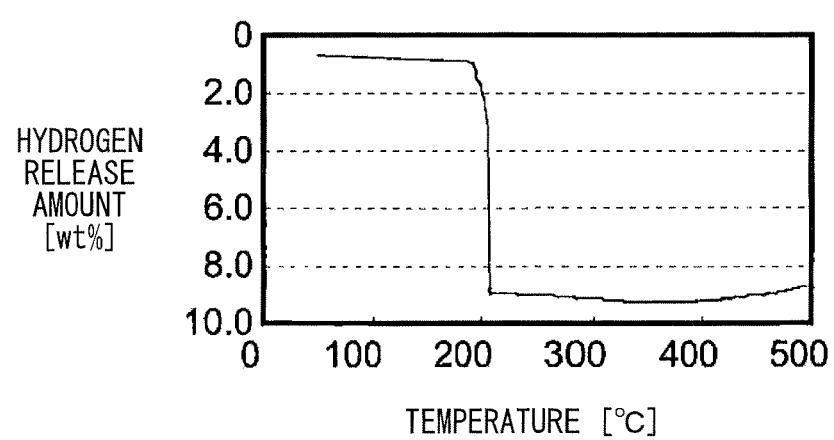
FIG. 9 is a thermogravimetric analysis chart of the particulate synthetic product (the crystalline $AlH_3$)

For comparison, also the particulate synthetic product was subjected to the thermogravimetric analysis under the same conditions as above. The results are shown in FIG. 9. As shown in FIG. 9, in the particulate synthetic product (the crystalline $AlH_3$), significant weight reduction (i.e. hydrogen release) was observed at around 200° C.

It is clear from the above results that the final product (the nanostructure) is a hydrogen storage material capable of releasing a large amount of hydrogen at low temperature. This is presumed due to the high grain boundary phase content of the microstructure.

Although certain preferred embodiments of the present invention have been shown and described in detail, it should be understood that various changes and modifications may be made therein without departing from the scope of the appended claims.

What is claimed is:

1. A hydrogen storage material capable of reversibly storing and releasing hydrogen, having a structure comprising a plurality of non-composite matrix phases and a grain boundary phase disposed between the matrix phases, wherein
    substantially all of the plurality of the non-composite matrix phases are composed of dissociated Al and have a side length of 1 to 200 nm, and
    the grain boundary phase comprises an amorphous phase and contains dissociated hydrogen in a state of a solid solution.

2. A hydrogen storage material according to claim 1, wherein the ratio of the grain boundary phase to the structure is 20% to 90% by volume.

3. A hydrogen storage material according to claim 1, wherein the grain boundary phase has a hydrogen storage initiation pressure of 10 to 100 MPa.

4. A hydrogen storage material according to claim 1, wherein the grain boundary phase has a hydrogen release initiation temperature of 60° C. to 70° C.

5. The hydrogen storage material of claim 1, wherein about 5 wt % is releasable hydrogen.

6. The hydrogen storage material of claim 1, wherein the matrix phase is an Al crystal lattice.

7. The hydrogen storage material of claim 1, wherein the matrix phase is characterized by an X-ray diffraction pattern substantially as shown in FIG. 6.

8. The hydrogen storage material of claim 7, wherein the X-ray diffraction pattern of the hydrogen storage material is characteristic of a matrix phase of aluminum.

9. The hydrogen storage material of claim 1, wherein the matrix phase is characterized by an X-ray diffraction pattern having a plurality of sharp peaks that are characteristic of a matrix phase of aluminum.

* * * * *